(12) United States Patent
ElHattab et al.

(10) Patent No.: US 11,847,911 B2
(45) Date of Patent: Dec. 19, 2023

(54) OBJECT-MODEL BASED EVENT DETECTION SYSTEM

(71) Applicant: Samsara Networks Inc., San Francisco, CA (US)

(72) Inventors: Saleh ElHattab, San Francisco, CA (US); Justin Joel Delegard, West Chester, OH (US); Bodecker John DellaMaria, Crystal Lake, IL (US); Brian Tuan, Cupertino, CA (US); Jennifer Winnie Leung, Berkeley, CA (US); Sylvie Lee, Pittsburgh, PA (US); Jesse Michael Chen, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 29 days.

(21) Appl. No.: 17/304,810

(22) Filed: Jun. 25, 2021

(65) Prior Publication Data

US 2021/0397908 A1 Dec. 23, 2021

Related U.S. Application Data

(63) Continuation of application No. 16/395,927, filed on Apr. 26, 2019, now Pat. No. 11,080,568.

(51) Int. Cl.
*G06V 20/40* (2022.01)
*G08G 1/0962* (2006.01)
(Continued)

(52) U.S. Cl.
CPC .......... *G08G 1/09623* (2013.01); *B60C 9/00* (2013.01); *B60Q 9/00* (2013.01); *G06F 18/251* (2023.01);
(Continued)

(58) Field of Classification Search
CPC .......... G06K 9/6289; B60C 9/00; B60Q 9/00; G06V 20/41; G06V 20/46; G06V 20/582;
(Continued)

(56) References Cited

U.S. PATENT DOCUMENTS 9,137,498 B1 * 9/2015 L'Heureux .......... G08G 1/0175
9,990,553 B1 6/2018 Chan et al.
(Continued)

FOREIGN PATENT DOCUMENTS

WO 2018131322 7/2018

OTHER PUBLICATIONS

"U.S. Appl. No. 16/794,114, Response filed Oct. 29, 2021 to Non Final Office Action dated Sep. 22, 2021", 10 pages.
(Continued)

*Primary Examiner* — Solomon G Bezuayehu
(74) *Attorney, Agent, or Firm* — Schwegman Lundberg & Woessner, P.A.

(57) ABSTRACT

Example embodiments described herein therefore relate to an object-model based event detection system that comprises a plurality of sensor devices, to perform operations that include: generating sensor data at the plurality of sensor devices; accessing the sensor data generated by the plurality of sensor devices; detecting an event, or precursor to an event, based on the sensor data, wherein the detected event corresponds to an event category; accessing an object model associated with the event type in response to detecting the event, wherein the object model defines a procedure to be applied by the event detection system to the sensor data; and streaming at least a portion of a plurality of data streams generated by the plurality of sensor devices to a server system based on the procedure, wherein the server system may perform further analysis or visualization based on the portion of the plurality of data streams.

14 Claims, 11 Drawing Sheets

(51) Int. Cl.

| | | |
|---|---|---|
| *G08G 1/052* | (2006.01) | |
| *B60Q 9/00* | (2006.01) | |
| *B60C 9/00* | (2006.01) | |
| *G06V 20/58* | (2022.01) | |
| *G06V 20/59* | (2022.01) | |
| *G06F 18/25* | (2023.01) | |

(52) U.S. Cl.
CPC .............. *G06V 20/40* (2022.01); *G06V 20/41* (2022.01); *G06V 20/46* (2022.01); *G06V 20/582* (2022.01); *G06V 20/597* (2022.01); *G08G 1/052* (2013.01); *G06V 20/44* (2022.01)

(58) Field of Classification Search
CPC ...... G06V 20/597; G06V 20/44; G06V 20/40; G08G 1/052; G08G 1/0112; G08G 1/0129; G08G 1/04; G08G 1/09623
See application file for complete search history.

(56) References Cited

U.S. PATENT DOCUMENTS

| | | | |
|---|---|---|---|
| 10,037,606 | B2 | 7/2018 | Sakai |
| 10,037,711 | B2 | 7/2018 | Chauncey et al. |
| 10,196,071 | B1 | 2/2019 | Rowson et al. |
| 10,389,739 | B2 | 8/2019 | Solotorevsky |
| 10,445,559 | B2 | 10/2019 | Joseph et al. |
| 10,460,183 | B2 | 10/2019 | Welland et al. |
| 10,623,899 | B2 | 4/2020 | Watkins et al. |
| 10,782,691 | B2 | 9/2020 | Suresh et al. |
| 10,997,430 | B1 | 5/2021 | Slavin |
| 10,999,374 | B2 | 5/2021 | Elhattab et al. |
| 11,080,568 | B2 | 8/2021 | Elhattab et al. |
| 11,100,767 | B1 | 8/2021 | Lee et al. |
| 11,494,921 | B2 | 11/2022 | Elhattab et al. |
| 11,611,621 | B2 | 3/2023 | Elhattab et al. |
| 2003/0081935 | A1 | 5/2003 | Kirmuss |
| 2005/0131646 | A1 | 6/2005 | Camus et al. |
| 2005/0286774 | A1 | 12/2005 | Porikli |
| 2009/0141939 | A1 | 6/2009 | Chambers et al. |
| 2010/0278271 | A1* | 11/2010 | MacInnis ............. H04N 19/174 |
| | | | 375/240.18 |
| 2010/0281161 | A1 | 11/2010 | Cohn et al. |
| 2011/0234749 | A1 | 9/2011 | Alon |
| 2012/0026334 | A1 | 2/2012 | Kamada et al. |
| 2012/0218416 | A1* | 8/2012 | Leny .................... H04N 7/181 |
| | | | 348/E7.085 |
| 2013/0147686 | A1 | 6/2013 | Clavin et al. |
| 2013/0250040 | A1 | 9/2013 | Vitsnudel et al. |
| 2013/0332004 | A1 | 12/2013 | Gompert et al. |
| 2014/0012492 | A1 | 1/2014 | Bowers et al. |
| 2014/0113619 | A1 | 4/2014 | Tibbitts et al. |
| 2014/0146182 | A1 | 5/2014 | Endo |
| 2014/0266694 | A1 | 9/2014 | Mccluskey et al. |
| 2015/0074091 | A1 | 3/2015 | Walkin et al. |
| 2015/0116114 | A1 | 4/2015 | Boyles |
| 2015/0347121 | A1 | 12/2015 | Harumoto |
| 2016/0046298 | A1 | 2/2016 | Deruyck et al. |
| 2016/0284009 | A1 | 9/2016 | Shah |
| 2016/0293049 | A1 | 10/2016 | Monahan et al. |
| 2017/0102463 | A1 | 4/2017 | Hwang |
| 2017/0124476 | A1 | 5/2017 | Levinson et al. |
| 2017/0263120 | A1 | 9/2017 | Durie, Jr. et al. |
| 2017/0291611 | A1 | 10/2017 | Innes et al. |
| 2017/0291800 | A1 | 10/2017 | Scoville et al. |
| 2017/0323641 | A1 | 11/2017 | Shimizu et al. |
| 2017/0345283 | A1 | 11/2017 | Kwon et al. |
| 2017/0366935 | A1 | 12/2017 | Ahmadzadeh et al. |
| 2018/0001899 | A1 | 1/2018 | Shenoy et al. |
| 2018/0063576 | A1 | 3/2018 | Tillman et al. |
| 2018/0068206 | A1 | 3/2018 | Pollach et al. |
| 2018/0071610 | A1* | 3/2018 | Miller .................... G09B 5/065 |
| 2018/0072313 | A1* | 3/2018 | Stenneth ................ G01S 17/89 |
| 2018/0075309 | A1 | 3/2018 | Sathyanarayana et al. |
| 2018/0082500 | A1 | 3/2018 | Joodaki et al. |
| 2018/0174485 | A1 | 6/2018 | Stankoulov |
| 2018/0178811 | A1 | 6/2018 | Ohta |
| 2018/0247109 | A1 | 8/2018 | Joseph et al. |
| 2018/0262724 | A1 | 9/2018 | Ross |
| 2018/0295141 | A1 | 10/2018 | Solotorevsky |
| 2018/0315340 | A1 | 11/2018 | Chauncey et al. |
| 2018/0329381 | A1 | 11/2018 | Doh et al. |
| 2018/0357484 | A1 | 12/2018 | Omata |
| 2019/0003848 | A1 | 1/2019 | Hoten et al. |
| 2019/0007690 | A1* | 1/2019 | Varadarajan ........... G06V 20/46 |
| 2019/0054876 | A1 | 2/2019 | Ferguson et al. |
| 2019/0065951 | A1 | 2/2019 | Luo et al. |
| 2019/0077308 | A1 | 3/2019 | Kashchenko |
| 2019/0120947 | A1 | 4/2019 | Wheeler et al. |
| 2019/0137622 | A1 | 5/2019 | Lopez-hinojosa et al. |
| 2019/0147263 | A1 | 5/2019 | Kuehnle et al. |
| 2019/0174158 | A1 | 6/2019 | Herrick et al. |
| 2019/0244301 | A1 | 8/2019 | Seth et al. |
| 2019/0257661 | A1 | 8/2019 | Stentz et al. |
| 2019/0265712 | A1 | 8/2019 | Satzoda et al. |
| 2019/0272725 | A1 | 9/2019 | Viklund et al. |
| 2019/0286948 | A1 | 9/2019 | Sathyanarayana et al. |
| 2019/0303718 | A1 | 10/2019 | Tanigawa et al. |
| 2019/0327590 | A1 | 10/2019 | Kubo et al. |
| 2019/0370581 | A1 | 12/2019 | Cordell et al. |
| 2020/0018612 | A1 | 1/2020 | Wolcott |
| 2020/0026282 | A1 | 1/2020 | Choe et al. |
| 2020/0050182 | A1 | 2/2020 | Cheng et al. |
| 2020/0074326 | A1 | 3/2020 | Balakrishnan et al. |
| 2020/0086852 | A1 | 3/2020 | Krekel et al. |
| 2020/0162489 | A1 | 5/2020 | Bar-nahum et al. |
| 2020/0164509 | A1 | 5/2020 | Shults et al. |
| 2020/0168094 | A1 | 5/2020 | Shimodaira et al. |
| 2020/0283003 | A1 | 9/2020 | Raichelgauz |
| 2020/0311602 | A1 | 10/2020 | Hawley et al. |
| 2020/0312155 | A1 | 10/2020 | Kelkar et al. |
| 2020/0327009 | A1* | 10/2020 | Callison .................. H04Q 9/04 |
| 2020/0327369 | A1 | 10/2020 | Cruz et al. |
| 2020/0342230 | A1 | 10/2020 | Tsai et al. |
| 2020/0342235 | A1 | 10/2020 | Tsai et al. |
| 2020/0342274 | A1 | 10/2020 | Elhattab et al. |
| 2020/0342611 | A1 | 10/2020 | Elhattab et al. |
| 2020/0344301 | A1 | 10/2020 | Elhattab et al. |
| 2021/0227031 | A1 | 7/2021 | Elhattab et al. |
| 2022/0165073 | A1* | 5/2022 | Shikii ........................ G06T 7/00 |

OTHER PUBLICATIONS

"U.S. Appl. No. 16/395,948, Response filed Nov. 18, 2021 to Final Office Action dated Aug. 18, 2021", 10 pages.
"U.S. Appl. No. 16/794,106, Final Office Action dated Dec. 2, 2021", 13 pages.
"U.S. Appl. No. 16/395,948, Non Final Office Action dated Dec. 22, 2021", 15 pages.
"U.S. Appl. No. 16/395,927, Non Final Office Action dated Jun. 11, 2019", 10 pgs.
"U.S. Appl. No. 16/395,927, Response filed Aug. 8, 2019 to Non Final Office Action dated Jun. 11, 2019", 14 pgs.
"U.S. Appl. No. 16/395,927, Final Office Action dated Oct. 16, 2019", 15 pgs.
"U.S. Appl. No. 16/395,927, Response filed Jan. 15, 2020 to Final Office Action dated Oct. 16, 2019", 12 pgs.
"U.S. Appl. No. 16/395,927, Non Final Office Action dated Mar. 5, 2020", 16 pgs.
"U.S. Appl. No. 16/395,927, Examiner Interview Summary dated Apr. 13, 2020", 3 pgs.
"U.S. Appl. No. 16/395,960, Non Final Office Action dated Apr. 30, 2020", 11 pgs.
"U.S. Appl. No. 16/395,927, Response filed Jun. 1, 2020 to Non Final Office Action dated Mar. 5, 2020", 13 pgs.
"U.S. Appl. No. 16/395,960, Examiner Interview Summary dated Jun. 8, 2020", 3 pgs.
"U.S. Appl. No. 16/395,960, Response filed Jun. 26, 2020 to Non Final Office Action dated Apr. 30, 2020", 11 pgs.
"U.S. Appl. No. 16/395,960, Final Office Action dated Jul. 23, 2020", 14 pgs.

(56) References Cited

OTHER PUBLICATIONS

"U.S. Appl. No. 16/395,927, Final Office Action dated Aug. 28, 2020", 10 pgs.
"U.S. Appl. No. 16/395,927, Examiner Interview Summary dated Oct. 8, 2020", 3 pgs.
"U.S. Appl. No. 16/395,927, Response filed Oct. 14, 2020 to Final Office Action dated Aug. 28, 2020", 13 pgs.
"U.S. Appl. No. 16/395,960, Response filed Nov. 23, 2020 to Final Office Action dated Jul. 23, 2020", 11 pgs.
"U.S. Appl. No. 16/395,927, Non Final Office Action dated Nov. 24, 2020", 10 pgs.
"U.S. Appl. No. 16/395,960, Notice of Allowance dated Jan. 13, 2021", 15 pgs.
"U.S. Appl. No. 16/395,948, Non Final Office Action dated Feb. 18, 2021", 13 pgs.
"U.S. Appl. No. 16/395,927, Response filed Mar. 18, 2021 to Non Final Office Action dated Nov. 24, 2020", 12 pgs.
"U.S. Appl. No. 16/395,927, Notice of Allowance dated Apr. 7, 2021", 14 pgs.
"U.S. Appl. No. 16/395,948, Response filed May 12, 2021 to Non Final Office Action dated Feb. 18, 2021", 12 pgs.
"U.S. Appl. No. 16/794,106, Non Final Office Action dated Jun. 8, 2021", 12 pgs.
"U.S. Appl. No. 16/794,106, Examiner Interview Summary dated Jul. 12, 2021", 2 pgs.
"U.S. Appl. No. 16/395,948, Final Office Action dated Aug. 18, 2021", 15 pgs.
"U.S. Appl. No. 16/794,106, Response filed Sep. 8, 2021 to Non Final Office Action dated Jun. 8, 2021", 11 pgs.
"U.S. Appl. No. 16/794,114, Non Final Office Action dated Sep. 22, 2021", 10 pgs.
Su, "Bayseian depth estimation from monocular natural images", Journal of Vision, (2017).
"U.S. Appl. No. 16/794,106, Response filed Feb. 2, 2022 to Final Office Action dated Dec. 2, 2021", 11 pgs.
"U.S. Appl. No. 16/794,106, Advisory Action dated Feb. 10, 2022", 3 pgs.
"U.S. Appl. No. 16/794,114, Final Office Action dated Feb. 11, 2022", 13 pgs.
"U.S. Appl. No. 16/794,106, Non Final Office Action dated Mar. 22, 2022", 14 pgs.
"U.S. Appl. No. 16/395,948, Response filed Mar. 22, 2022 to Non Final Office Action dated Dec. 22, 2021", 11 pgs.
"U.S. Appl. No. 16/794,114, Response filed Apr. 29, 2022 to Final Office Action dated Feb. 11, 2022", 10 pgs.
"U.S. Appl. No. 16/301,658, Non Final Office Action dated May 11, 2022", 14 pgs.
"U.S. Appl. No. 16/794,114, Non Final Office Action dated May 24, 2022", 12 pgs.
"U.S. Appl. No. 16/794,106, Response filed Jun. 14, 2022 to Non Final Office Action dated Mar. 22, 2022", 11 pgs.
"U.S. Appl. No. 16/395,948, Notice of Allowance dated Jun. 30, 2022", 10 pgs.
"U.S. Appl. No. 17/301,658, Response filed Jul. 11, 2022 to Non Final Office Action dated May 11, 2022", 11 pgs.
"U.S. Appl. No. 16/395,948, Corrected Notice of Allowability dated Jul. 22, 2022", 6 pgs.
"U.S. Appl. No. 17/301,658, Final Office Action dated Aug. 2, 2022", 15 pgs.
"U.S. Appl. No. 16/794,114 Response filed Aug. 9, 2022 to Non-Final Office Action filed May 24, 2022", 16 pgs.
"U.S. Appl. No. 16/794,106, Final Office Action dated Sep. 12, 2022", 15 pgs.
"U.S. Appl. No. 17/301,658 Final Office Action filed Sep. 9, 2022", 16 pgs.
"U.S. Appl. No. 16/794,114, Final Office Action dated Nov. 4, 2022", 13 pgs.
"U.S. Appl. No. 16/794,106, Response filed Nov. 9, 2022 to Final Office Action dated Sep. 12, 2022", 12 pgs.
"U.S. Appl. No. 17/301,658, Notice of Allowance dated Nov. 16, 2022", 15 pgs.
"U.S. Appl. No. 16/794,114, Response filed Nov. 22, 2022 to Final Office Action dated Nov. 4, 2022", 10 pgs.
"U.S. Appl. No. 17/820,685, Non Final Office Action dated Dec. 8, 2022", 19 pgs.
"U.S. Appl. No. 16/794,114, Non Final Office Action dated Feb. 16, 2023", 13 pgs.
"U.S. Appl. No. 16/794,106, Non Final Office Action dated Feb. 23, 2023", 15 pgs.
"U.S. Appl. No. 17/820,685, Response filed Mar. 7, 2023 to Non Final Office Action dated Dec. 8, 2022", 10 pgs.
"U.S. Appl. No. 17/820,685, Final Office Action dated Mar. 30, 2023", 13 pgs.
"U.S. Appl. No. 17/820,685, Response filed May 2, 2023 to Final Office Action dated Mar. 30, 2023", 9 pgs.
"U.S. Appl. No. 16/794,114, Response filed May 2, 2023 to Non Final Office Action dated Feb. 16, 2023", 10 pgs.
"U.S. Appl. No. 17/820,685, Advisory Action dated May 16, 2023", 3 pgs.
"U.S. Appl. No. 16/794,106, Response filed May 23, 2023 to Non Final Office Action dated Feb. 23, 2023", 12 pgs.

* cited by examiner

400 

DETECTING A FEATURE WITHIN A FRAME OF A VIDEO STREAM OF THE SENSOR DATA, THE FEATURE ASSOCIATED WITH THE EVENT TYPE OF THE EVENT
402

IDENTIFYING A PRECURSOR TO THE EVENT BASED ON THE FEATURE WITHIN THE FRAME OF THE VIDEO STREAM
404

ACCESSING INERTIAL DATA FROM AN ACCELEROMETER STREAM OF THE SENSOR DATA IN RESPONSE TO THE DETECTING THE PRECURSOR TO THE EVENT
406

DETECTING THE EVENT BASED ON THE INERTIAL DATA
408

*FIG. 4*

OBJECT-MODEL BASED EVENT DETECTION SYSTEM

PRIORITY APPLICATION

This application is a continuation of and claims priority to U.S. patent application Ser. No. 16/395,927, filed Apr. 26, 2019, the disclosure of which is incorporated herein in its entirety by reference.

TECHNICAL FIELD

Embodiments of the present disclosure relate generally the field of communication technology and, more particularly, but not by way of limitation, to an architecture for systems and methods for detecting events based on sensor data collected at one or more sensor devices.

BACKGROUND

A dashcam, or event data recorder (EDR), is an onboard camera that continuously records the view through a vehicle's front windscreen and sometimes the interior of the vehicle. Some EDRs also record acceleration, deceleration, speed, steering angle, global positioning system (GPS) data, and throttle position information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of accessing sensor data from a plurality of sensor devices responsive to detecting an event, according to certain example embodiments

DETAILED DESCRIPTION

Figure 1:
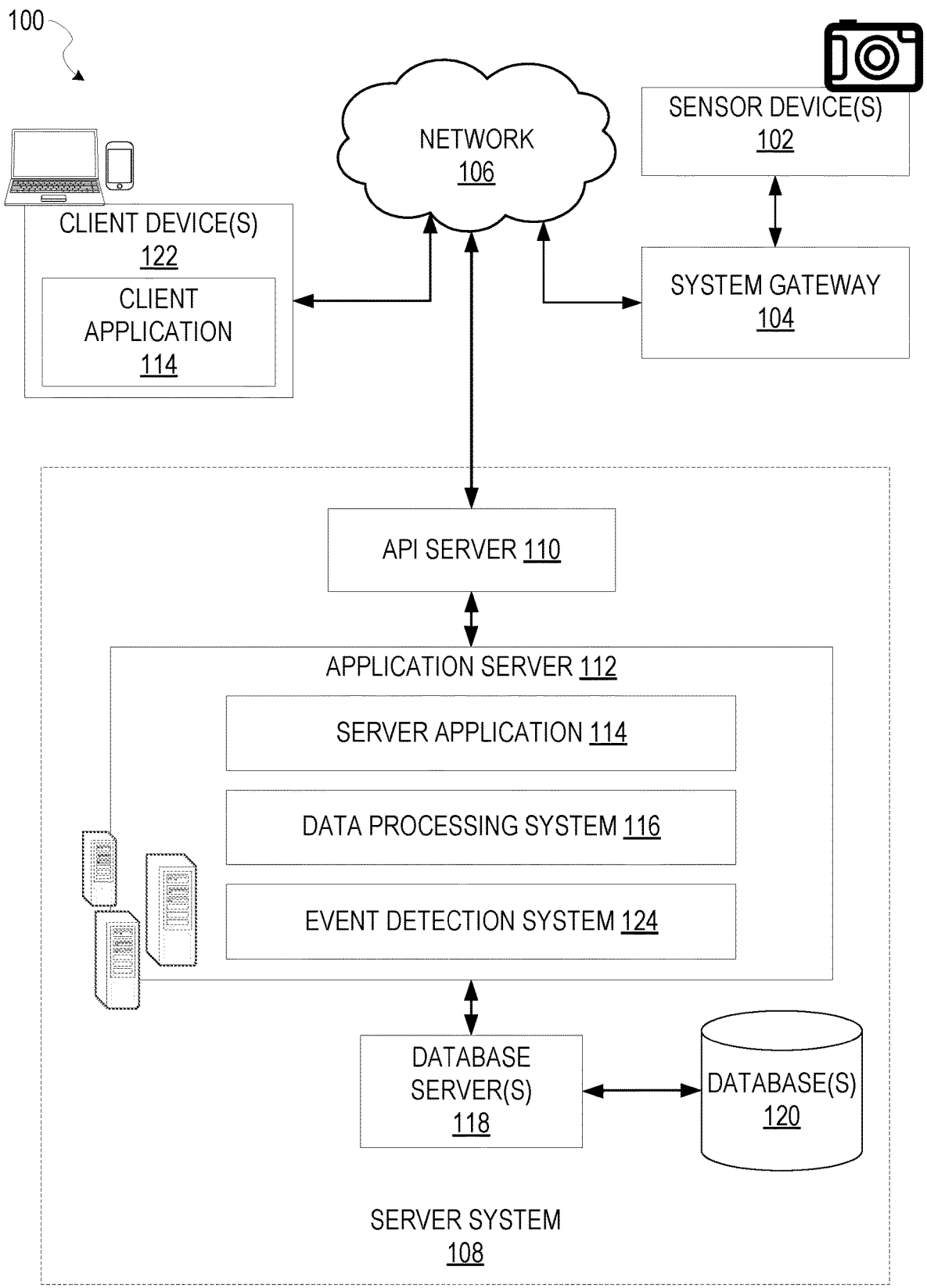
FIG. 1 is a block diagram showing an example system for exchanging data (e.g., sensor data and associated content) over a network in accordance with some embodiments, wherein the system includes an event detection system.

As discussed above, EDRs may include devices with an integrated onboard camera that continuously record data that include video, as well as acceleration, deceleration, speed, steering angle, global positioning system (GPS) data, and throttle position information. EDRs therefore generate data which can be used to review activities performed by a fleet of vehicles and can be used to formulate bases for improvements in safety in a variety of areas.

While these systems are effective in recording data related to events, the existing systems lack functionality to efficiently detect and monitor events, and precursors to events, in real-time, let alone to provide interfaces to enable users to manage and view recorded data. A system which detects events and provides real-time data monitoring is therefore described below.

Example embodiments described herein relate to an event detection system that comprises a plurality of sensor devices to perform operations that include: generating sensor data at the plurality of sensor devices; accessing the sensor data generated by the plurality of sensor devices; detecting an event, or precursor to an event, based on the sensor data, wherein the detected event corresponds to an event category; accessing an object model associated with the event type in response to detecting the event, wherein the object model defines a procedure to be applied by the event detection system to the sensor data; and streaming at least a portion of a plurality of data streams generated by the plurality of sensor devices to a server system based on the procedure, wherein the server system may perform further analysis or visualization based on the portion of the plurality of data streams.

The plurality of sensors may include a front facing camera, and a cabin facing camera (e.g., a dashcam), as well as an accelerometer, a gyroscope, one or more microphones, a temperature sensor, GPS sensors, as well as an interface to couple the event detection system with a vehicle electronic control unit (ECU), and all configured to generate a plurality of data streams that may be used to detect events or precursors to events. The plurality of sensors may in some embodiments be integrated into a single package, while in further embodiments, one or more of the sensors may be mounted at remote positions from one another based on use and need. The plurality of sensors may further be coupled with a network gateway (hereinafter "gateway"). The gateway facilitates sharing sensor data generated by the plurality of sensor devices from one discrete network to another, and in some embodiments may perform additional processing for the event detection system.

As discussed herein, an "event" may comprise a combination of conditions detected by the sensor devices. An administrator of the event detection system may provide event definitions, wherein each event definition includes one or more of: an event type or identifier (e.g., roll-over, crash, speeding, rolling stop, distracted driver); a set of thresholds; and a set of conditions represented by a set of sensor data from one or more sensor devices from among the plurality of sensor devices of the event detection system. For example, a "rolling stop" may be defined by a set of conditions that include: the presence of a stop sign in one or more frames of a video stream; inertial data indicating that a stop did not occur; and GPS data indicating that a vehicle did not stop at a location associated with the stop sign.

Similarly, a "precursor" to the event may be defined by a portion of an event definition. For example, in the example of the "rolling stop" described above, a precursor to the event may be defined as the detection of the stop sign in one or more frames of the video stream.

In some embodiments, each event type or identifier of an event definition may be associated with corresponding object models. An object model of a particular event or precursor to an event includes the event definitions of the event and precursors to the events and defines procedures or subroutines to be performed by the event detection system in response to detecting an event or precursor to an event. For example, the procedures of an object model may define a data-flow of sensor data through one or more processing components of the event detection system, processing operations to be performed upon the sensor data at the one or more processing components of the event detection system, visualization and display instructions for the sensor data, as well as a bit rate (hereinafter "data rate") to generate and access the sensor data responsive to detecting an event or precursor to an event.

The detection of events and precursors to events may be performed by one or more processors associated with the plurality of sensor devices, one or more processors associated with the gateway, or by one or more processors associated with the server system, or any combination thereof.

According to certain example embodiments, the detection of events based on the sensor data may include: detecting events based on a comparison of sensor data to one or more thresholds defined by the event definitions; detecting events by detecting features within the sensor; and detecting events based on an output of a neural network (i.e., a time delayed neural network) trained to recognize features corresponding to certain events and precursors to events.

Accordingly, in some example embodiments, detection of an event by the plurality of sensors may be based upon video data generated by one or more cameras of the event detection system. For example, a neural network or machine learned model may be trained to recognize features or signals corresponding to certain types of objects that correspond with an event definition (e.g., signage, a stop sign, yield, children crossing, rail-road, etc.). In some embodiments, the signals detected may also include gestures performed by an occupant of a vehicle (e.g., a peace sign). Responsive to recognizing the features that correspond to the object associated with the event definition, the event detection system may access an object model associated with the corresponding event definition. An object model defines procedures and subroutines to be performed by the event detection system.

Similarly, detection of an event by the plurality of sensors may be based upon a stereoscopic inference model generated by the event detection system based on sensor data from one or more of the sensor devices. For example, the plurality of sensors may include a dashcam, and the sensor data may include video data that comprises monocular image data. The event detection system may generate a depth model based on the monocular image data through a stereoscopic inference model trained to construct a 3-dimensional (3D) depth model based on monocular image data. The event detection system may compare the depth model against one or more threshold values to detect events.

In further embodiments, the method of detecting an event may vary based upon the type of sensor data accessed and analyzed. In some embodiments the sensor data may include inertial data, audio data, or location data. Detecting of an event may therefore include detecting one or more values of the sensor data transgressing threshold values corresponding to event types. For example, an event may be triggered based on an inertial value transgressing a threshold value, or in further embodiments, an event may be triggered based on the location data generated by a sensor device transgressing a boundary, or reaching a destination.

The object models associated with events may further define presentation and display instructions for sensor data of the events. The presentation and display instructions may include an identification of one or more client devices to present a notification responsive to the detection of an event, as well as display instructions to visualize and display sensor data corresponding to events. For example, the notification may include a display of an identifier associated with a sensor device, as well as one or more event attributes of the detected event.

FIG. 1 is a block diagram showing an example system 100 for detecting events based on sensor data. The system 100 includes one or more client device(s) 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the system 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor device(s) 102, and the system gateway 104. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an event detection system 124. The event detection system 124 is configured to access sensor data generated by the one or more sensor devices 102, detect events or precursors to events based on the sensor data, and access an object model that corresponds with the events or precursors to events, wherein the object model defines a data-flow, according to some example embodiments. Further details of the event detection system 124 can be found in FIG. 2 below.

The server application 114 implements a number of data processing technologies and functions, particularly related to the aggregation and other processing of data (e.g., sensor data generated by the sensor devices 102). As will be described in further detail, the sensor data generated by the sensor devices 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor devices 102 and processed by the server application 114.

Figure 2:
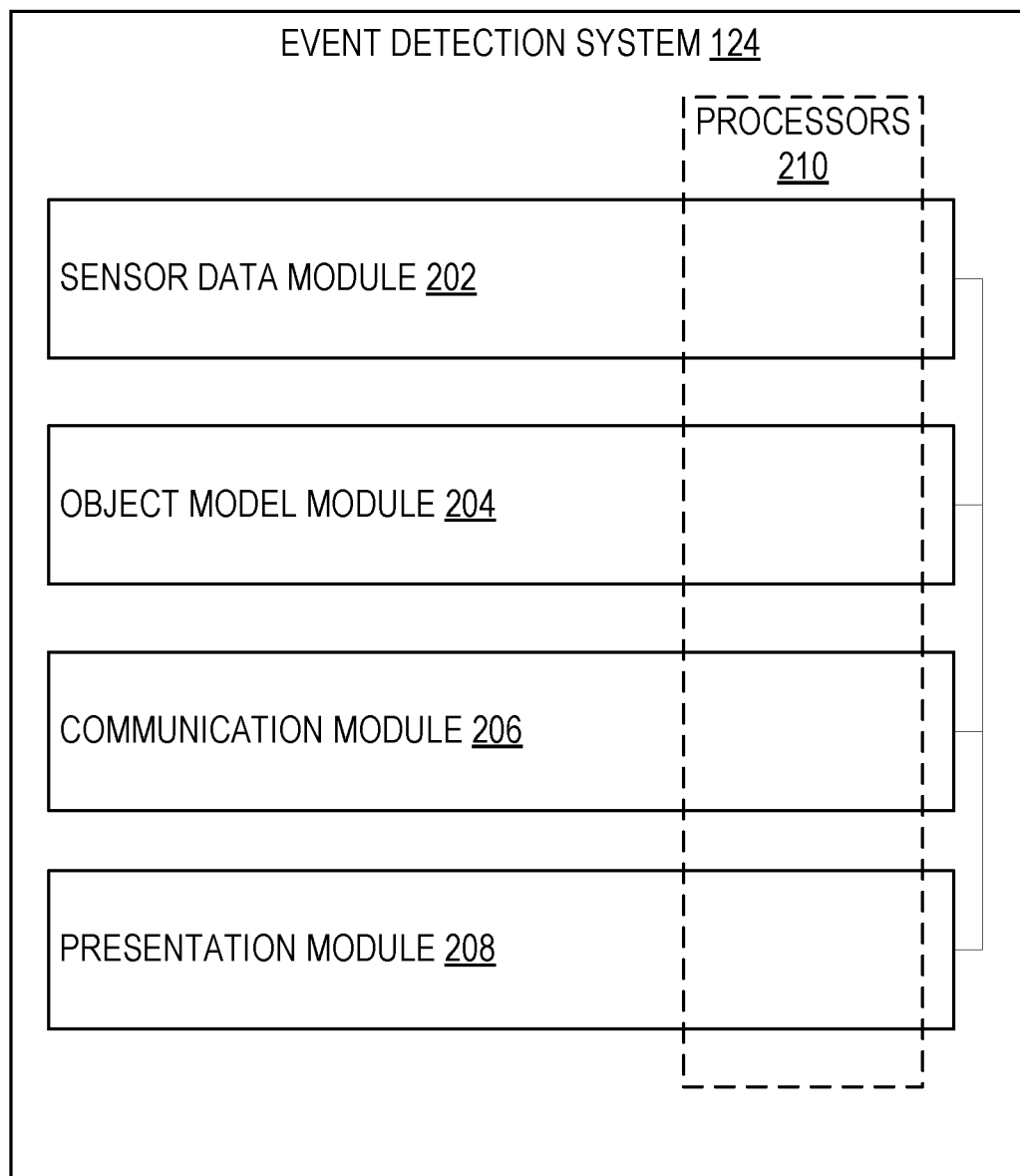
FIG. 2 is a block diagram illustrating various modules of an event detection system, according to certain example embodiments.

FIG. 2 is a block diagram illustrating components of the event detection system 124 that configure the event detection system 124 to perform operations to access sensor data generated by a plurality of sensor devices, detect events or precursors to events based on the sensor data, and to access an object model that corresponds to the event or precursor to the event detected based on the sensor data, according to some example embodiments.

The event detection system 124 is shown as including a sensor data module 202, an object model module 204, a communication module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the event detection system 124 may physically include an arrangement of one or more of the processors 210 (e.g., a subset of or among the one or more processors of the machine) configured to perform the operations described herein for that module. As another example, any module of the event detection system 124 may include software, hardware, or both, that configure an arrangement of one or more processors 210 (e.g., among the one or more processors of the machine) to perform the operations described herein for that module. Accordingly, different modules of the event detection system 124 may include and configure different arrangements of such processors 210 or a single arrangement of such processors 210 at different points in time. Moreover, any two or more modules of the event detection system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

As discussed above, according to certain example embodiments, the event detection system 124 may maintain one or more object models that correspond with a plurality of event definitions, where an object model includes the conditions associated with an event definition and comprises a set of procedures and subroutines to be performed by the event detection system 124 responsive to the detection of an event or precursor to an event. In some embodiments, a portion of the object models and event definition may be stored within the databases 120, at the server system 108, while in further embodiments, a portion of the object models and event definitions may be stored at a local memory of the sensor devices 102, the gateway 104, as well as the client device 122.

Figure 3:
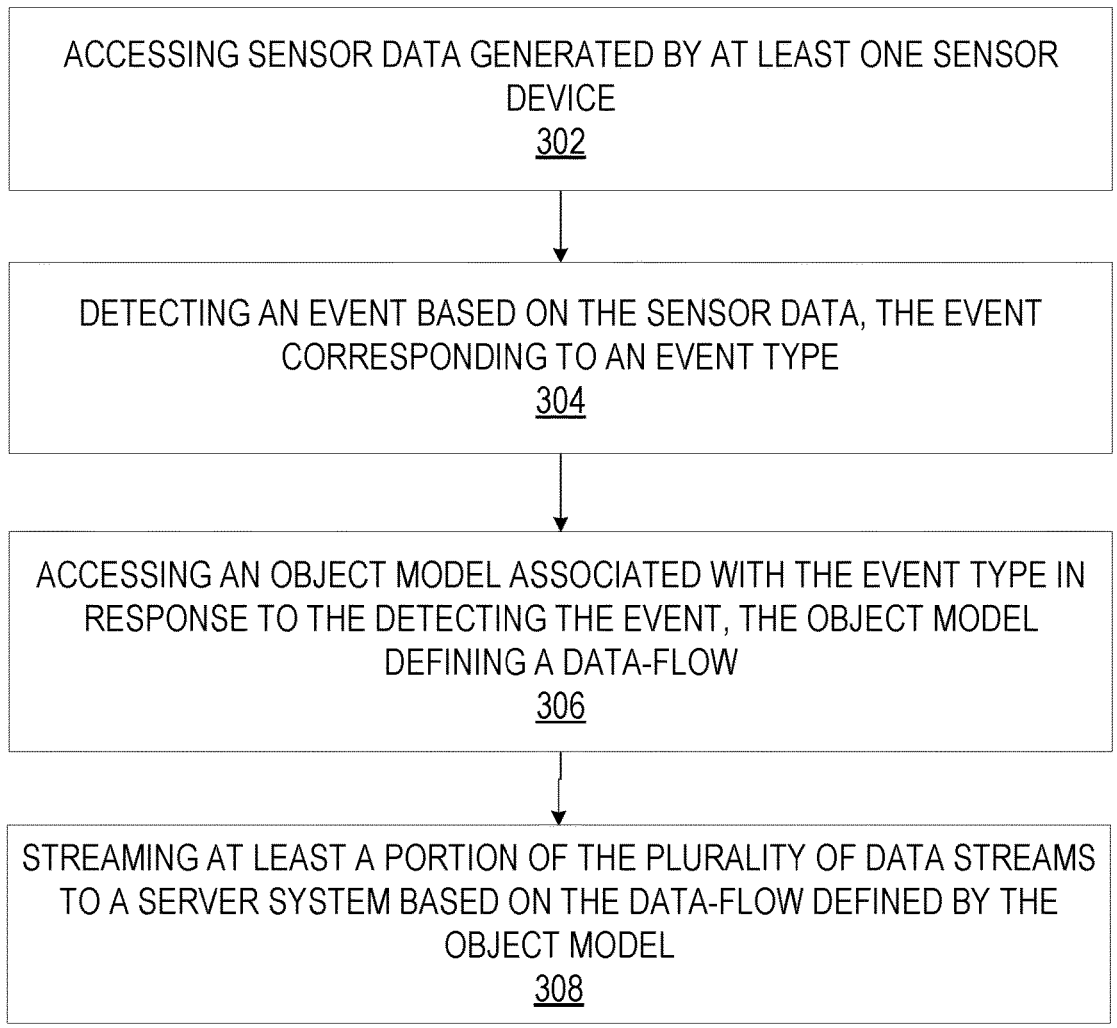
FIG. 3 is a flowchart depicting a method of detecting an event based on sensor data from a plurality of sensor devices and an object model, according to certain example embodiments.

FIG. 3 is a flowchart depicting a method 300 of detecting an event based on sensor data from a plurality of sensor devices 102, and an object model, according to certain example embodiments. Operations of the method 300 may be performed by the modules described above with respect to FIG. 2. As shown in FIG. 3, the method 300 includes one or more operations 302, 304, 306, and 308.

At operation 302, sensor data generated by at least one sensor device is accessed at a first network node. For example, the sensor data module 202 accesses sensor data generated by at least one sensor device from among the sensor device(s) 102 at a baseline data rate. The sensor device may include a camera, such as a dashcam, and the sensor data may comprise a video stream.

The sensor data module 202 detects an event or precursor to an event based on the sensor data, wherein the event or precursor to the event corresponds to an event definition. The event or precursor to the event detected by the sensor data module 202 can for example include a feature of a video frame from video data collected from a dashcam (e.g., a sensor device 102). The feature may correspond to an object depicted within the video.

According to certain embodiments, the sensor data module 202 may include a machine learned model or neural network trained to recognize features corresponding to certain types of objects (e.g., signage, a stop sign, yield, children crossing, rail-road, etc.), and to receive sensor data, and output a result that includes an identification of an object. As an illustrative example, the sensor device 102 may include a dashcam, and the sensor data may comprise video data generated by the dashcam and collected by the sensor data module 202 at a first data rate, and the neural network may be trained with labeled feature data to identify one or more events based on the labeled feature data.

At operation 306, in response to the sensor data module 202 detecting the event or precursor to the event based on the sensor data, the object model module 204 accesses an object model that corresponds with the event or precursor to the event detected based on the sensor data. The object model provides event definitions associated with the precursor to the event detected by the sensor data module 202 and provides a procedure to be performed by the event detection system 124 that includes a data flow of sensor data from the sensor devices 102, and a set of conditions or criteria associated with the detected event or precursor to the event, such as threshold values.

At operation 308, based on the procedure defined by the object model, a second network node accesses sensor data from the portion of the sensor devices. For example, the communication module 206 causes the gateway 104 to access sensor data from a portion of the sensor devices 102 based on the procedure defined by the object model. In some embodiments, at operation 308, the communication module 206 may additionally cause the gateway 104 to stream the sensor data from the portion of the sensor devices to the server system 108 for further analysis.

In certain example embodiments, the object model associated with a precursor to an event may identify one or more sensor devices to activate or access responsive to the precursor to the event. For example, in some embodiments, the event detection system 124 may be configured to access and record sensor data from a "primary" sensor device (e.g., a dashcam), and in response to detecting a precursor to an event, accessing one or more secondary sensor devices to retrieve sensor data.

FIG. 4 is a flowchart depicting a method 400 of accessing sensor data from a plurality of sensor devices 102 responsive to detecting an event, according to certain example embodiments. Operations of the method 400 may be performed by the modules described above with respect to FIG. 2. As shown in FIG. 4, the method 400 includes one or more operations 402, 404, 406, and 408. In some embodiments, the operations of the method 400 may be performed as a precursor to, or subroutine of, one or more of the operations of the method 300 depicted in FIG. 3, such as operation 302.

According to certain example embodiments, the sensor devices 102 may include one or more cameras, such as dashcams, wherein the dashcams may be directed inside a vehicle, to capture images and videos depicted occupants of the vehicle, as well as directed in front of and in some cases behind the vehicle.

At operation 402, the sensor data module 202 detects a feature within a frame of a video stream from one or more of the sensor devices 102. In some embodiments, the sensor data module 202 may include a neural network or machine learned model trained to recognize certain features that correspond to events and precursors to events. For example, the features may depict objects such as signs (e.g., a stop sign) as well as facial features and expressions of a driver of a vehicle.

At operation 404, in response to detecting a feature within the frame of the video stream from one or more of the sensor devices 102, the sensor data module 202 determines that the feature corresponds to a precursor to an event. For example, the feature may include a gaze direction of a driver of the vehicle, or a sign depicted within a frame of the video stream.

In some embodiments, the precursor to the event may correspond with an object model that defines conditions and thresholds associated with an event. For example, an event may include running a stop-sign or red light, while the precursor to the event is the detection of a sign or stop light within an image frame of the video stream generated by one or more of the sensor devices 102. Responsive to the sensor data module 202 detecting the precursor to the event, the object model module 204 accesses an object model that includes an event definition comprising a set of conditions and thresholds, and provides procedures and subroutines to be performed by one or more modules of the event detection system 124 in response to detecting the precursor to the event.

At operation 406, the sensor data module 202 accesses a portion of the sensor data generated by the sensor devices 102 based on the object model associated with the precursor to the event. For example, the portion of the sensor data identified by the object model based on the definition of the event associated with the precursor may include inertial data, GPS data, as well as vehicle ECU data. At operation 408, the sensor data module 202 detects the event based on the portion of the sensor data generated by the sensor devices 102. In some embodiments, the operations of the method 400 may be performed by one or more processors of the sensor devices 102 themselves, or by one or more processors associated with the gateway 104, or any combination thereof.

In certain example embodiments, the event detection system 124 may be configured to access and stream sensor data from the sensor devices 102 at a "baseline" data rate. For example, under normal operating conditions, in the absence of one or more event conditions, the event detection system 124 may be configured to cause the sensor devices 102 to generate sensor data at a reduced resolution, and to cause the gateway 104 to stream segments of sensor data to the server system 108 at predefined intervals based on the baseline data rate.

Accordingly, in some embodiments, the procedures defined by the object models may include instructions to cause one or more processors associated with the sensor devices 102, the gateway 104, and the client device 122 to increase the data rate and resolution in which sensor data is generated and accessed by the event detection system 124, responsive to detecting an event or precursor to an event.

Figure 5:
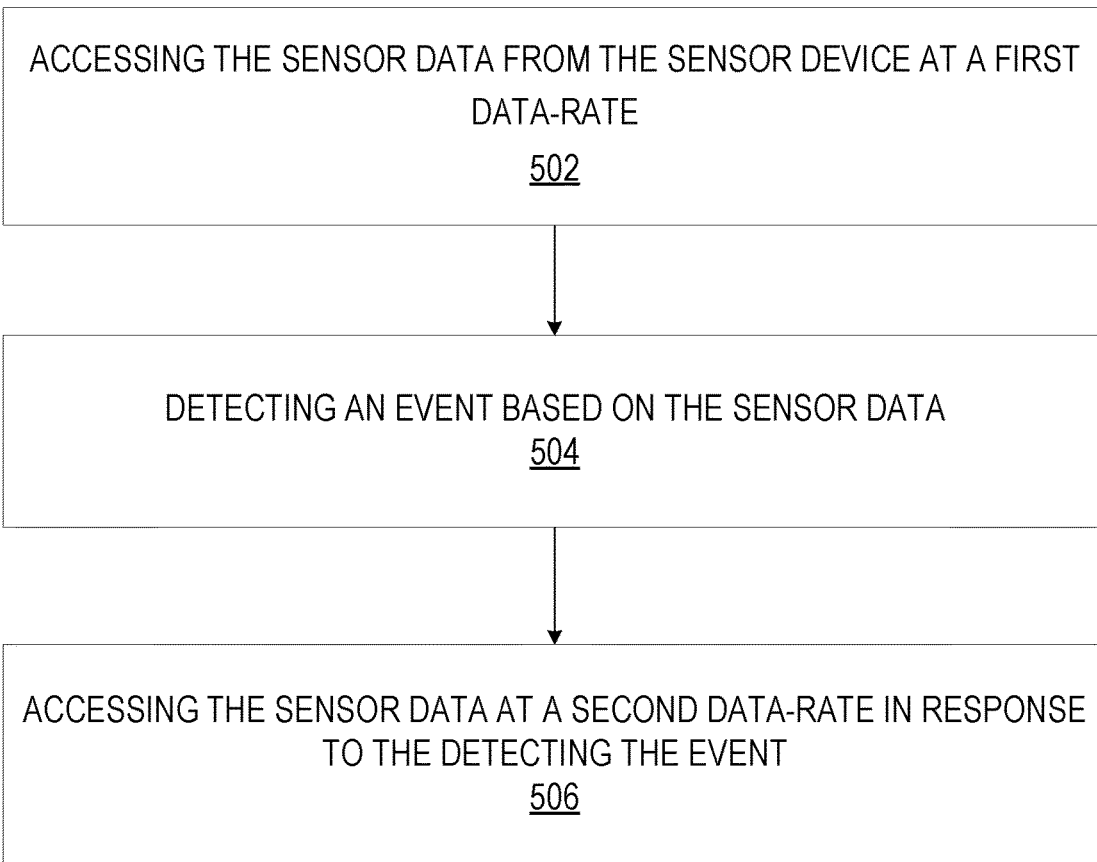
FIG. 5 is a flowchart depicting a method of detecting an event, according to certain example embodiments.

FIG. 5 is a flowchart depicting a method 500 of detecting an event based on sensor data generated by a plurality of sensor devices 102, according to certain example embodiments. Operations of the method 500 may be performed by the modules described above with respect to FIG. 2. As shown in FIG. 5, the method 500 includes one or more operations 502, 504, and 506. The method 500 may be performed as a precursor to, or subroutine of, one or more of the operations of the methods 300 and 400, as depicted in FIGS. 3 and 4.

At operation 502, the sensor data module 202 accesses sensor data from the plurality of sensor devices 102 at a first data rate. For example, the event detection system 124 may be configured to access and stream data from the plurality of sensor devices 102 at a baseline data rate.

In some embodiments, the event detection system 124 may be configured to cause the gateway 104 to stream snapshots of sensor data from the sensor devices 102 at a predefined interval or data rate. For example, at the baseline rate, the event detection system 124 may only stream a portion of the sensor data from the sensor devices 102 through the gateway 104 to the server system 108.

At operation 504, the sensor data module 202 detects an event, or a precursor to an event, based on the sensor data, as discussed in the methods 300 and 400 of FIGS. 3 and 4. In response to detecting the event or precursor to the event, at operation 506, the event detection system 124 may cause the sensor data module 202 to access the sensor data from the sensor devices 102 at a second data rate. In some embodiments, the second data rate may be based on an event type of the event or precursor to the event detected by the sensor data module 202.

In some embodiments, operation 506 may also include causing the sensor data module 202 to stream a sensor data from a specific set of sensor devices from among the sensor devices 102. For example, in response to detecting an event based on sensor data from a first sensor device, the sensor data module 202 may access and stream sensor data from the first sensor device, and a second and third sensor device from among a plurality of sensor devices.

Figure 6:
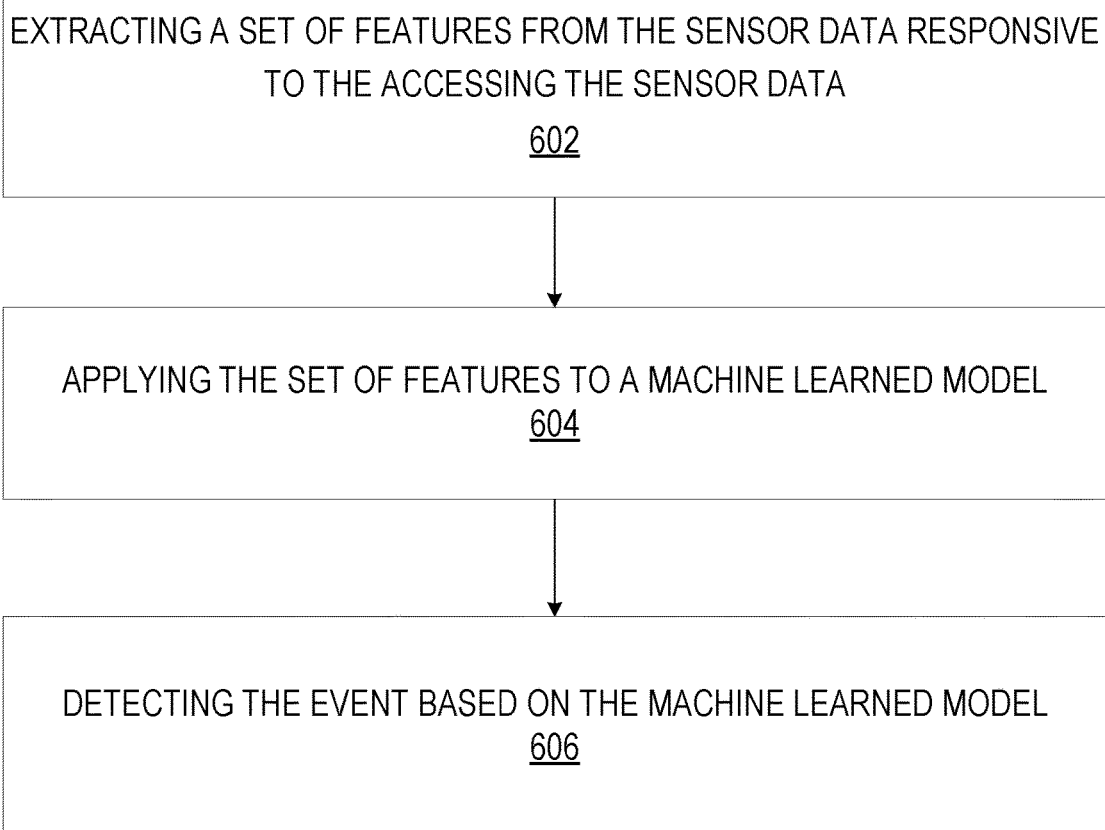
FIG. 6 is a flowchart depicting a method of detecting an event, according to certain example embodiments.

FIG. 6 is a flowchart depicting a method 600 of detecting an event based on sensor data generated by a plurality of sensor devices 102, according to certain example embodiments. Operations of the method 600 may be performed by the modules described above with respect to FIG. 2. As shown in FIG. 6, the method 600 includes one or more operations 602, 604, and 606. The method 600 may be performed as a precursor to, or subroutine of, one or more of the operations of the methods 300, 400, and 500, as depicted in FIGS. 3, 4, and 5.

At operation 602, upon accessing the sensor data from the sensor devices 102, as in operation 302 of the method 300, and operation 502 of the method 500, the sensor data module 202 extracts a set of features from the sensor data. For example, the sensor data may include video data generated by a dashcam, wherein the dashcam is configured to capture images of occupants of a vehicle. The set of features extracted from the sensor data may therefore include facial landmarks and image features depicting the occupants of the vehicle.

In response to extracting the set of features from the sensor data generated by the sensor devices 102, at operation 604 the sensor data module 202 applies the set of features to a machine learning model trained to identify events and precursors to events based on features. For example, the machine learning model may be trained to identify a distracted driver based on gaze tracking features. At operation 606, the sensor data module 202 identifies an event or precursor to an event based on the machine learned model.

Figure 7:
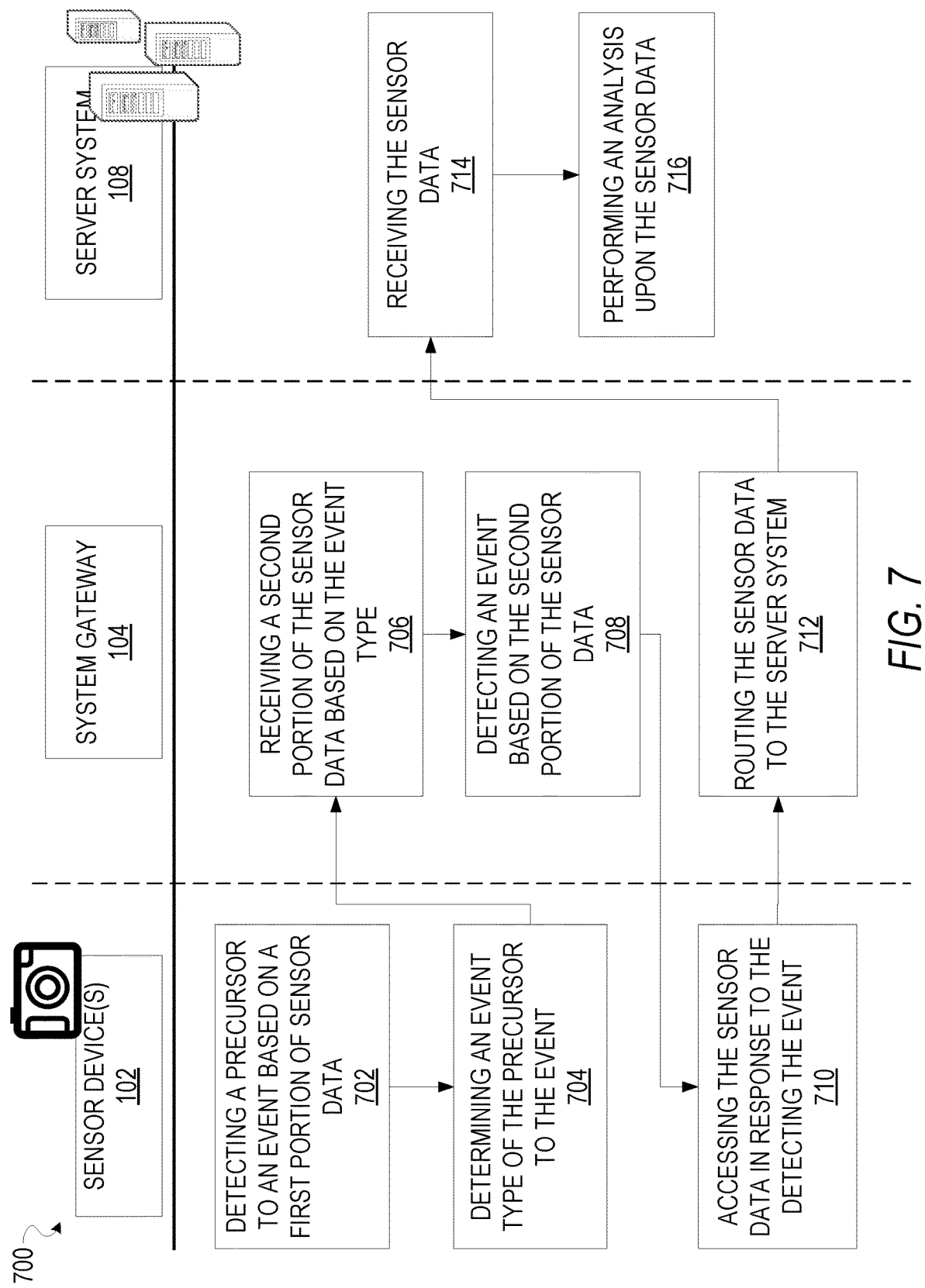
FIG. 7 is an interaction diagram depicting a flow of data, according to certain example embodiments.

FIG. 7 is an interaction diagram 700 depicting a flow of sensor data generated by the sensor devices 102, according to certain example embodiments. Operations of the interaction diagram 700 may be performed by the modules described above with respect to FIG. 2.

At operation 702, the sensor devices 102 detects a precursor to an event based on a first portion of sensor data generated by the sensor devices 102. For example, the first portion of the sensor data may include video data generated by a dashcam, and the precursor to the event may include a feature within the sensor data. For example, sensor devices 102 may include a neural network trained to identify objects correlated with precursors to events.

At operation 704, based on detecting the precursor to the event, the sensor devices 102 determines an event type that corresponds with the precursor to the event. The event type identifies an object model that defines a data flow of the sensor data.

At operation 706, the sensor devices 102 streams a second portion of the sensor data to the system gateway 104, where the second portion of the sensor data is based on the object model associated with the event type. At operation 708, the system gateway 104 detects an event based on the precursor to the event detected by the sensor device 102 and the second portion of the sensor data streamed by the sensor devices 102 to the system gateway 104.

At operation 710, based on the system gateway 104 detecting the event based on the second portion of the sensor data, the sensor devices 102 multiplex the sensor data from the plurality of sensors 102 and stream the multiplexed sensor data to the server system 108. At operation 712, the system gateway 104 routes the sensor data from the plurality of sensors 102 to the server system 108. At operation 714, the server system 108 receives the multiplexed sensor data.

In some embodiments, a portion of the plurality of sensors 102 may be integrated into the system gateway 104. For example, the system gateway 104 may include one or more sensor devices configured to generate sensor data. In further embodiments, the system gateway 104 may access the plurality of sensors 102 responsive to detecting an event based on a portion (e.g., the second portion) of the sensor data, as depicted in operation 708.

At operation 716, based on receiving the multiplexed sensor data, the server system 108 performs further analysis upon the sensor data, and in some embodiments may perform operations that include presenting a notification at a client device and causing display of a graphical user interface that comprises a presentation of visualizations based on the sensor data generated by the sensor devices 102.

For example, in some embodiments, the object model corresponding to the event may identify one or more client devices to be notified when an event is triggered and may also define notification features of the notifications to be presented. Responsive to detecting an event, the event detection system 124 presents the notification at the one or more client devices identified within the corresponding object model, wherein the notification includes a set of event attributes as defined based on the notification features from the object model.

Figure 8:
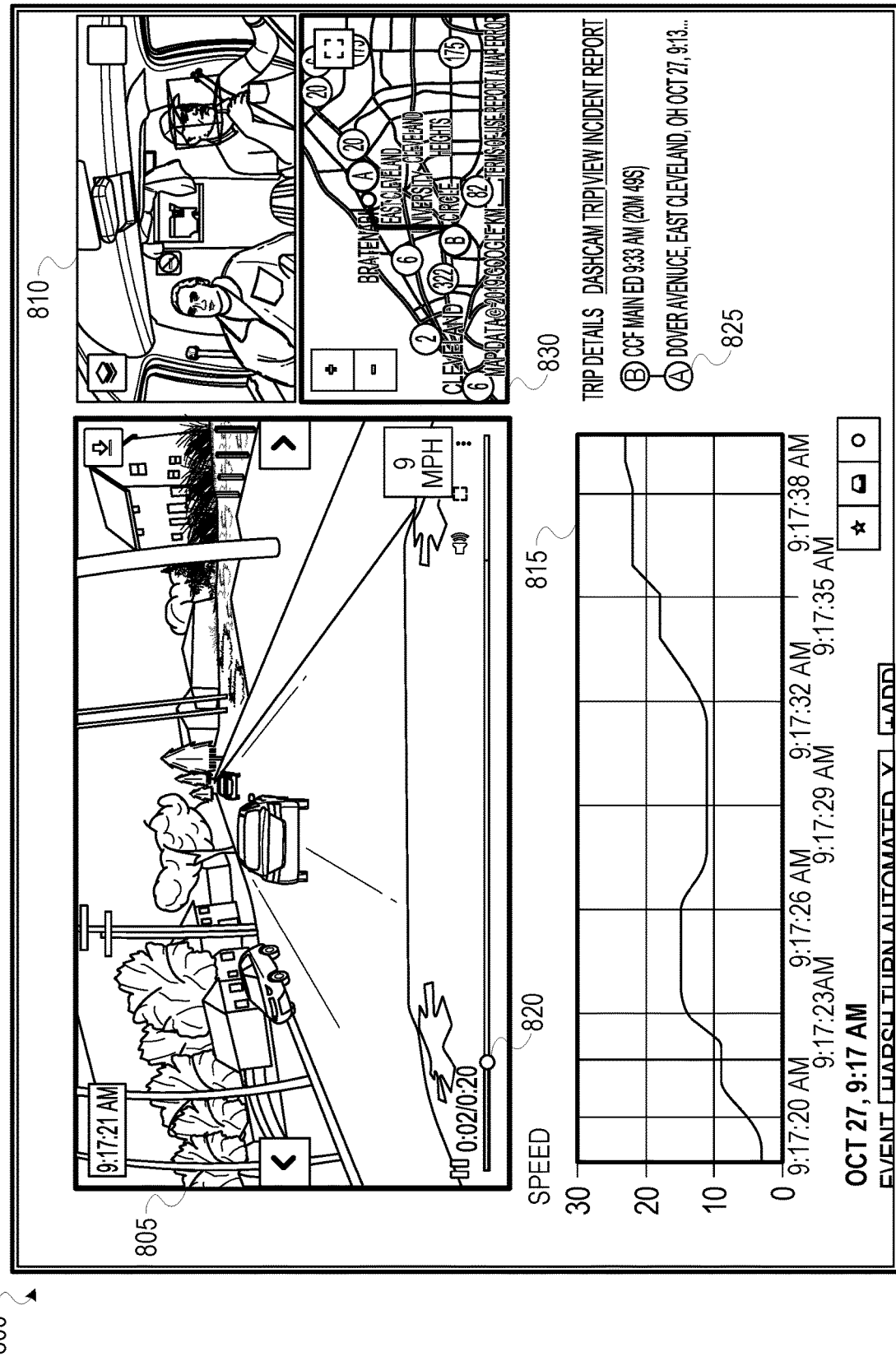
FIG. 8 is an interface diagram depicting a graphical user interface to present sensor data from one or more sensor devices, according to certain example embodiments.

FIG. 8 is an interface diagram depicting a GUI 800 to present sensor data from one or more sensor devices 102, according to certain example embodiments. As seen in the GUI 800, the presentation of the sensor data may include a video stream 805, depicting video data generated by a dashcam, a video stream 810, depicting video data generated by a driver facing dashcam, as well as a graph element 815, depicting sensor data captured by a vehicle ECU, and GPS data plotted over a period of time. In certain embodiments, the sensor data may also include an audio stream that comprises audio data collected by one or more sensor devices (i.e., microphones) in communication with the event detection system 124. For example, the audio data may be collected from a mobile device or device with similar audio recording capability, wherein the device may be coupled with one or more of the client device 122, the system gateway 104, the sensor devices 102, or the event detection system 124. Coupling may include wired as well as wireless connections. Accordingly, in such embodiments, a presentation of the audio data may be displayed at a position within the GUI 800, wherein the presentation of the audio data may include a visualization of the audio data, such as a display of a waveform, or an audio spectrum indicator.

In some embodiments, the period of time depicted by the graph element 815 may be based on temporal attributes of the video data depicted in the video streams 805 and 810. For example, the video stream 805 may include a display of a scrub bar, wherein a position of an indicator 820 on the scrub bar indicates a point in time of the video stream.

In some embodiments, the sensor data depicted in the graph element 815 may be scaled based on a length of the video data depicted in the video stream 805. For example, the position of the indicator 820 corresponds with a video frame of the video stream 805. As seen in the GUI 800, the position of the indicator 820 aligns vertically with corresponding sensor data in the graph element 815.

Similarly, the video stream 810 may be presented based on the video stream 805. For example, a user may provide an input moving the indicator 820 to a position that corresponds with a timestamped video frame of the video stream 805 along the scrub bar of the video stream 805. Based on receiving the input, the event detection system 124 updates the video stream 810 in the GUI 800 based on the position of the indicator 820 on the sub bar.

In some embodiments, the GUI 800 may include a display of an event log that includes a display of events detected by the event detection system 124, such as the event indicator 825. For example, based on detecting an event, as discussed in the methods 300 and 400 of FIGS. 3 and 4, the event detection system 124 may update the event log to include the event indicator 825, wherein properties of the event indicator 825 are based on attributes of the event.

In some embodiments, a user of the event detection system 124 may provide an input that selects an event indicator, such as the event indicator 825, and the event detection system 124 may update the GUI 800 to present the corresponding sensor data from the event. For example, updating the GUI 800 may include presenting a segment of the video streams 805 and 810 based on temporal attributes of the event associated with the event indicator 825.

In further embodiments, the GUI 800 may also include a map image 830. The map image 830 comprises indications of locations corresponding to the events from the event log. For example, the event indicator 825 comprises an identifier ("A") that is also presented at a location that corresponds with the event indicator 825 on the map image 830. A user may therefore determine where the event associated with the event indicator occurred based on the position of the identifier within the map image 830.

Figure 9:
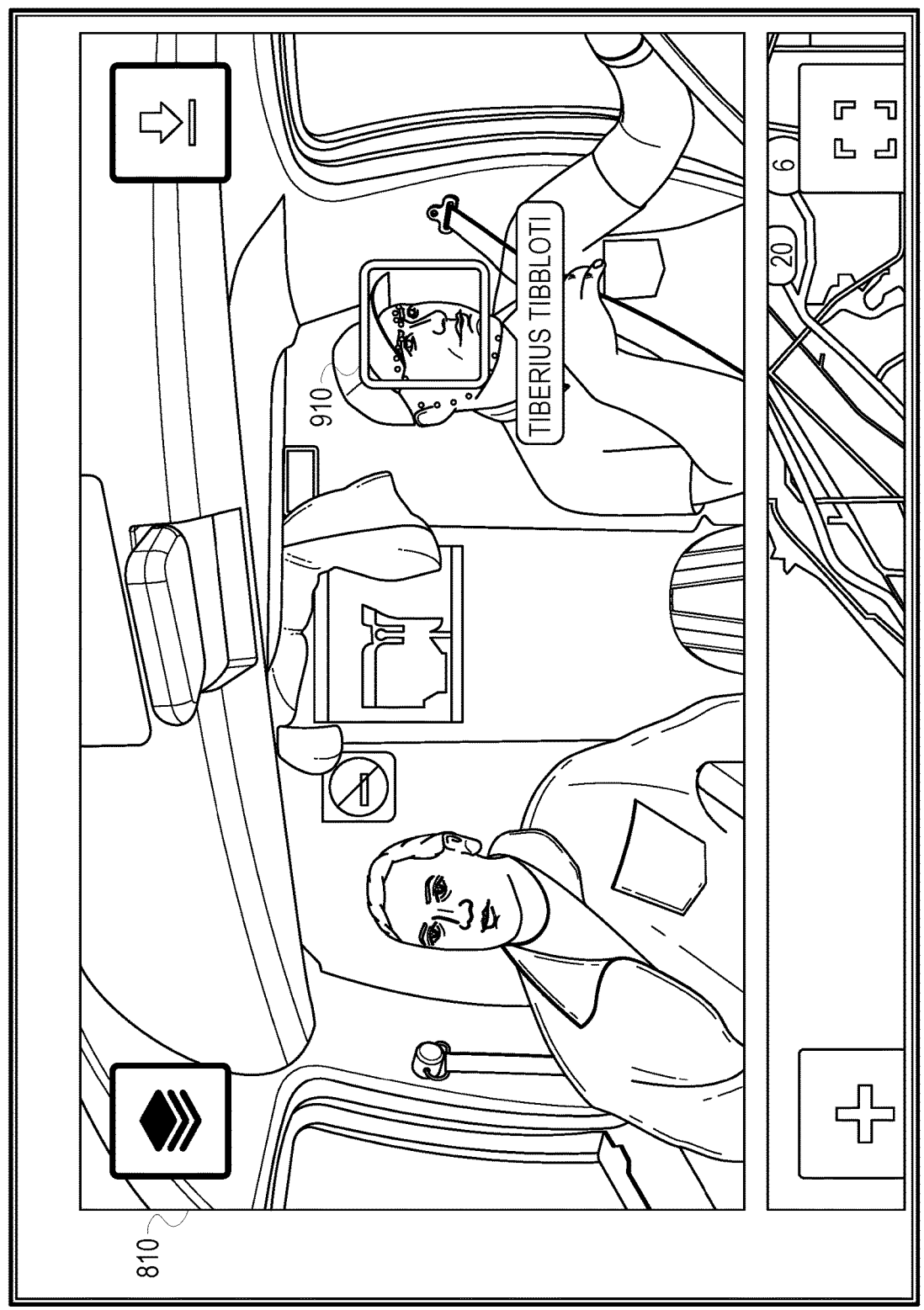
FIG. 9 is an interface diagram depicting sensor data from one or more sensor devices, according to certain example embodiments.

FIG. 9 is an interface diagram depicting sensor data 900 from one or more sensor devices 102, according to certain example embodiments. As seen in FIG. 9, the sensor data 900 may include the video stream 810 depicted in FIG. 8 The video stream 810 includes video data from a dashcam.

In some embodiments, a dashcam may be positioned to record video of a driver of a vehicle. Based on receiving the video data from the dashcam, the event detection system 124 may perform facial recognition to the video data to identify one or more occupants of the vehicle. Based on identifying the one or more occupants of the vehicle based on the video data, the event detection system 124 may present an identification 910 that includes a display of an identifier of an occupant of the vehicle.

Figure 10:
FIG. 10 is an interface diagram depicting sensor data from one or more sensor devices, according to certain example embodiments.

FIG. 10 is an interface diagram depicting sensor data 1000 from one or more sensor devices 102, according to certain example embodiments. As seen in FIG. 9, the sensor data 1000 may include the video stream 810 depicted in FIG. 8. The video stream 810 includes video data from a dashcam.

In some embodiments, a dashcam may be positioned to record video of a driver of a vehicle. Based on receiving the video data from the dashcam, the event detection system 124 may perform gaze detection on the video data to determine a point of attention of an occupant of the vehicle. Based on performing the gaze detection on the video data, the event detection system 124 may cause display of the gaze indicator 1005 within the video stream 810.

Figure 11:
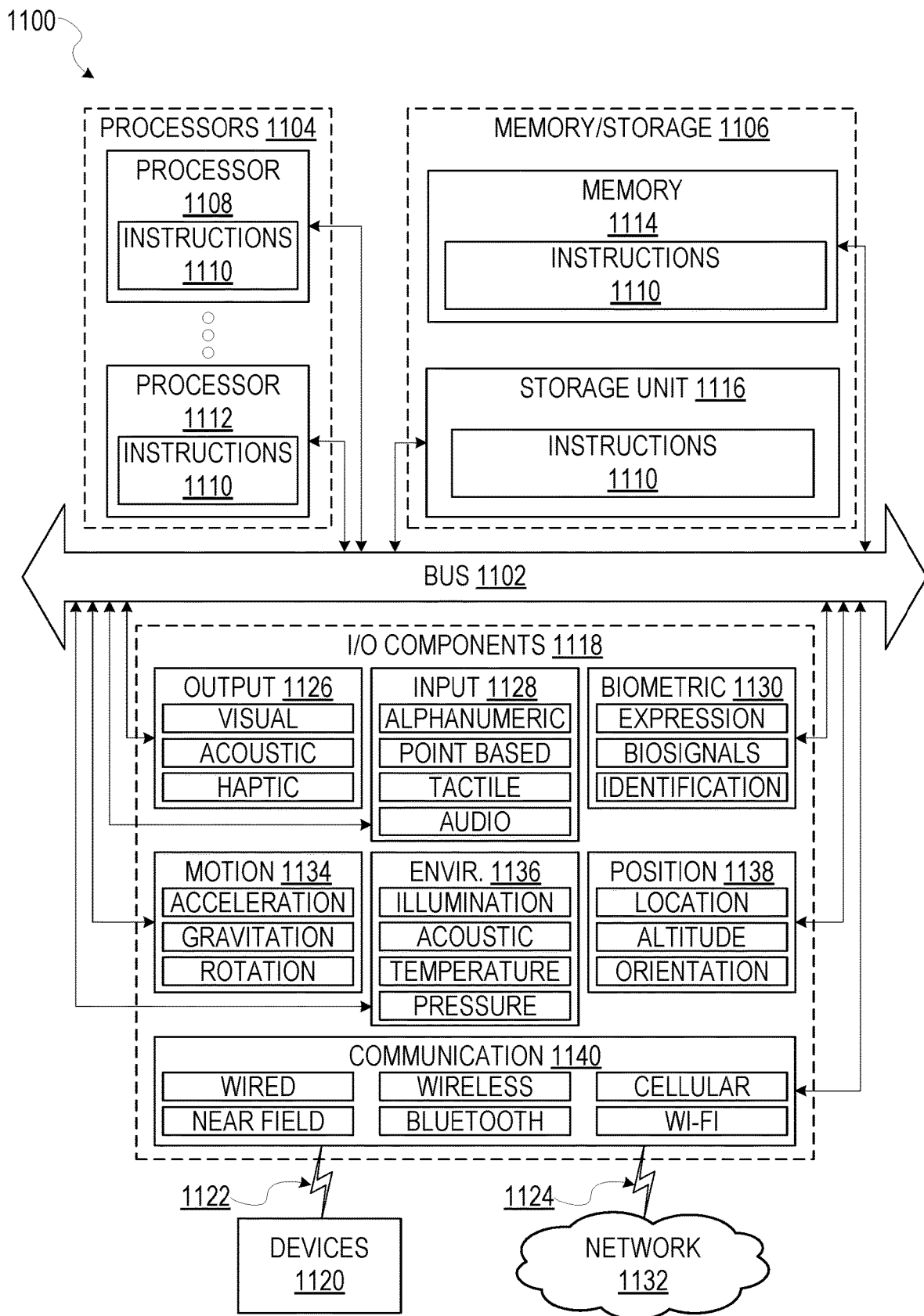
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A system comprising:
  a plurality of sensor devices that generate sensor data that comprises a plurality of data streams;
  a memory; and
  at least one hardware processor to perform operations comprising:
   accessing a video stream generated by a first sensor device from among the plurality of sensor devices of a vehicle, the video-stream comprising a video frame;
   detecting a feature within the video frame of the video-stream;
   identifying an object model that corresponds with the feature from among a plurality of object models, the object model comprising a set of display instructions, an identification of a second sensor device from among the plurality of sensor devices, and a client device from among one or more client devices;
   accessing the second sensor device from among the plurality of sensor devices based on the object model, the second sensor device configured to generate sensor data;
   generating a visualization of the sensor data based on the set of display instructions of the object model; and
   presenting a notification that includes the visualization of the sensor data generated by the second sensor device at the client device identified by the object model.

2. The system of claim 1, wherein the plurality of data streams comprise one or more of:
  an audio stream that comprises audio data;
  an accelerometer stream that comprises the inertial data; and
  a global positioning system stream that comprises location data.

3. The system of claim 1, wherein the video frame comprises a timestamp, and the transmitting the sensor data generated by the second sensor device further comprises:
  accessing a portion of the second sensor data based on the timestamp of the video frame; and
  transmitting the portion of the second sensor data to the server.

4. The system of claim 1, wherein the first sensor device comprises a driver-facing dashcam.

5. The system of claim 1, wherein the transmitting the sensor data to the server comprises transmitting a first portion of the sensor data to the server, and the operations further comprise:
  detecting a trigger event at the server based on the first portion of the sensor data generated by the second sensor device; and
  transmitting a second portion of the sensor device to the server based on the detecting the trigger event.

6. A method comprising:
  accessing a video stream generated by a first sensor device from among the plurality of sensor devices of a vehicle, the video-stream comprising a video frame;
  detecting a feature within the video frame of the video-stream;
  identifying an object model that corresponds with the feature from among a plurality of object models, the object model comprising a set of display instructions, an identification of a second sensor device from among the plurality of sensor devices, and a client device from among one or more client devices;
  accessing the second sensor device from among the plurality of sensor devices based on the object model, the second sensor device configured to generate sensor data;
  generating a visualization of the sensor data based on the set of display instructions of the object model; and
  presenting a notification that includes the visualization of the sensor data generated by the second sensor device at the client device identified by the object model.

7. The method of claim 6, wherein the plurality of data streams comprise one or more of:
  an audio stream that comprises audio data;
  an accelerometer stream that comprises the inertial data; and
  a global positioning system stream that comprises location data.

8. The method of claim 6, wherein the video frame comprises a timestamp, and the transmitting the sensor data generated by the second sensor device further comprises:
  accessing a portion of the second sensor data based on the timestamp of the video frame; and
  transmitting the portion of the second sensor data to the server.

9. The method of claim 6, wherein the first sensor device comprises a driver-facing dashcam.

10. The method of claim 6, wherein the transmitting the sensor data to the server comprises transmitting a first portion of the sensor data to the server, and the method further comprises:
  detecting a trigger event at the server based on the first portion of the sensor data generated by the second sensor device; and transmitting a second portion of the sensor device to the server based on the detecting the trigger event.

11. A non-transitory machine-readable storage medium comprising instructions that, when executed by one or more processors of a machine, cause the machine to perform operations comprising:
accessing a video stream generated by a first sensor device from among the plurality of sensor devices of a vehicle, the video-stream comprising a video frame;
detecting a feature within the video frame of the video-stream;
identifying an object model that corresponds with the feature from among a plurality of object models, the object model comprising a set of display instructions, an identification of a second sensor device from among the plurality of sensor devices, and a client device from among one or more client devices;
accessing the second sensor device from among the plurality of sensor devices based on the object model, the second sensor device configured to generate sensor data;
generating a visualization of the sensor data based on the set of display instructions of the object model; and
presenting a notification that includes the visualization of the sensor data generated by the second sensor device at the client device identified by the object model.

12. The non-transitory machine-readable storage medium of claim 11, wherein the plurality of data streams comprise one or more of:
an audio stream that comprises audio data;
an accelerometer stream that comprises the inertial data; and
a global positioning system stream that comprises location data.

13. The non-transitory machine-readable storage medium of claim 11, wherein the video frame comprises a timestamp, and the transmitting the sensor data generated by the second sensor device further comprises:
accessing a portion of the second sensor data based on the timestamp of the video frame; and
transmitting the portion of the second sensor data to the server.

14. The non-transitory machine-readable storage medium of claim 11, wherein the first sensor device comprises a driver-facing dashcam.

\* \* \* \* \*